Feb. 24, 1953 M. R. FIELDS 2,629,379
PUNCTURE INDICATING CLOSURE FOR MULTIPLE DOSE VIALS
Filed Feb. 21, 1951

INVENTOR.
Mack R. Fields
BY Albert E. Knauf
Atty.

Patented Feb. 24, 1953

2,629,379

UNITED STATES PATENT OFFICE 2,629,379

PUNCTURE INDICATING CLOSURE FOR MULTIPLE DOSE VIALS

Mack R. Fields, Libertyville, Ill., assignor to Abbott Laboratories, North Chicago, Ill., a corporation of Illinois Application February 21, 1951, Serial No. 212,104

2 Claims. (Cl. 128—272)

This invention relates to closures of multiple dose containers, and more particularly, to a multiple dose vial adapted to indicate the number and position of hypodermic needle punctures therethrough.

Multiple dose containers for therapeutic solutions are commonly used in the pharmaceutical art. Such containers are, generally, small glass vials holding sufficient liquid for more than one dose of the container liquid. The vial is closed by a self-sealing stopper, through which the hypodermic cannula is inserted to withdraw, as by a syringe, a standard dose of the medicine.

Several disadvantages are associated with the use of the multiple dose containers. First of all, it is difficult to accurately estimate the amount of liquid remaining, and, consequently, how many doses have been withdrawn. The most deleterious disadvantage, however, is the coring which occurs from repeatedly puncturing the stopper in approximately the same place, causing contamination of the liquid by small pieces of the rubber stopper. Coring generally occurs in multiple dose vials by crossing puncture holes, which actually cuts small bits of rubber from the stopper. As is known, a self-sealing rubber stopper closes a puncture hole leaving practically no mark, so that it is almost impossible to determine where the puncture occurred. The most likely spot for puncturing the stopper of the vial is the center thereof, hence coring occurs, as previous puncture marks are not readily discernable and invariably the stopper is punctured in the center thereof.

According to the present invention, I have discovered a closure which clearly indicates puncture marks, helping to prevent coring by showing where the previous punctures have occurred. The closure according to the invention comprises a self-sealing rubber stopper having a non-coring, non-self-sealing disc laminating on the top thereof.

Referring to the drawings.

Figure 1:
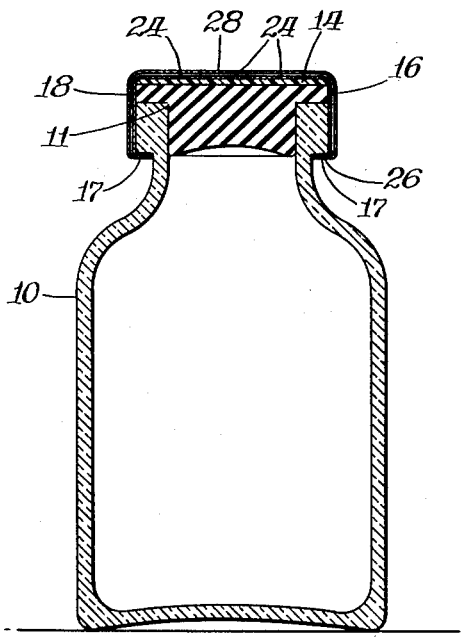
Figure 1 is a cross sectional view of a vial incorporating a closure according to the invention.
Figure 2:
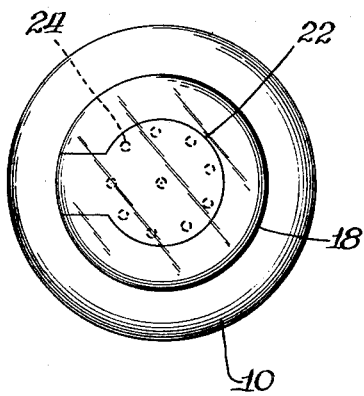
Figure 2 is a top plan view of the device of Figure 1.
Figure 3:
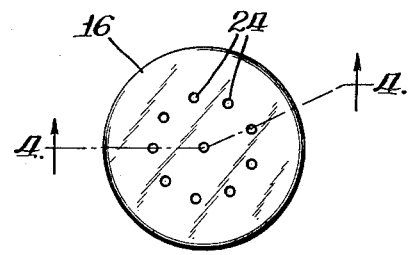
Figure 3 is a top plan view of a perforated cup for positioning needle punctures.
Figure 4:
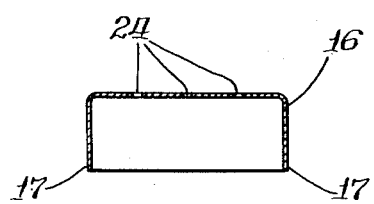
Figure 4 is a cross sectional view of the cup of Figure 3.

In the embodiment of the invention shown in Figure 1, a glass vial 10 has a single outlet 11 closed by a rubber stopper 12 of sufficient thickness to be substantially self-sealing when punctured by a thin hypodermic needle. On the top surface of the rubber stopper is secured a non-coring non-self-sealing thin plastic disc 14. The plastic disc is of thermoplastic resin, such as nylon, polyethylene, etc. A perforated cup 16, or inner cap, having ten holes 24 in the bottom thereof, is seated over and completely covers the stopper and plastic top. The lip 17 of the cup 16 is spun under the projecting flange 20 of the vial, securely sealing the rubber stopper in the mouth of the vial. A tear-tab cover 18 is placed over the inner cap and the lip 26 thereof is spun under the top assembly forming a tight cover therefor.

In use, the tear-tab 22 is pried up and pulled loose from the cap 18, whereby said cap may be removed. The removal of the cap exposes the inner cap 16, and also the perforations 24. The plastic disc 14 is visible through the perforations 24 and any punctures therethrough will leave a hole indicating such puncture. It is preferable to have the rubber stopper 12 made of a dark colored rubber, and the plastic disc 14 of a white or pale plastic whereby great contrast is obtained.

It is also preferable to have the plastic disc intimately seated on or cemented to the rubber stopper, where the backing obtained from the rubber stopper prevents coring of the disc when punctured by a hypodermic needle. With the intimate contact, the plastic disc on being punctured leaves a hole approximately the size of the needle, displaying the underlying rubber stopper. The disc does not impair the self-sealing qualities of the rubber stopper, but definitely shows the situs of a puncture.

The inner cap 16 serves the useful purpose of spacing the multiple punctures, so that crossing puncture holes is unlikely. When such an inner cap is provided, I prefer to make the number of holes in it equal to the number of standard doses in the container. With such equipment, the practitioner who picks up the container can tell at a glance which places have not yet been punctured, and also how many doses are left in the vial. However, the inner cap may be dispensed with for the sake of economy of scarce materials, permitting random punctures in the stopper, which, however, will be indicated by the holes in the plastic.

Others may readily adapt the invention for use under varying conditions of service by employing one or more of the novel features disclosed, or equivalents thereof. As at present advised with respect to the apparent scope of my invention, I desire to claim the following subject matter.

I claim:

1. In a multiple-dose medicinal container, an improved closure comprising, in combination: a stopper closing said container, said stopper being self-sealing after being punctured by a hypodermic needle; and a penetrable non-self-sealing thin thermoplastic film intimately contacting the upper surface of the said stopper, said film having a color which contrasts markedly with that of the stopper whereby perforations formed therein by puncturing the said stopper are readily discernable against the contrasting background of the stopper.

2. In a multiple-dose medicinal container, an improved closure comprising, in combination: a stopper closing said container, said stopper being self-sealing after being punctured by a hypodermic needle, a penetrable, non-self-sealing thin thermoplastic film intimately contacting the upper surface of the said stopper, said film having a color which contrasts markedly with that of the stopper whereby perforations formed therein by puncturing the said stopper are readily discernable against the contrasting background of the stopper, and a guide means contacting the upper surface of said film and firmly engaging the said container, said guide means having a number of spaced apertures therein equal to the number of medicinal doses in the said container.

MACK R. FIELDS.

REFERENCES CITED

The following references are of record in the file of this patent:

UNITED STATES PATENTS

| Number | Name | Date |
| --- | --- | --- |
| 2,020,828 | Goldberg | Nov. 12, 1935 |
| 2,022,369 | Curtis | Nov. 26, 1935 |
| 2,157,503 | Smith | May 9, 1939 |
| 2,229,739 | Harrington | Jan. 28, 1941 |
| 2,338,102 | Fields | Jan. 4, 1944 |
| 2,459,304 | Blank | Jan. 18, 1949 |